(12) United States Patent
Jones et al.

(10) Patent No.: US 9,110,877 B2
(45) Date of Patent: Aug. 18, 2015

(54) METHOD AND APPARATUS FOR UTILIZING AN EXTENSIBLE MARKUP LANGUAGE SCHEMA FOR MANAGING SPECIFIC TYPES OF CONTENT IN AN ELECTRONIC DOCUMENT

(75) Inventors: Brian M. Jones, Redmond, WA (US); E. Mark Sunderland, Seattle, WA (US); Marcin Sawicki, Kirkland, WA (US); Robert A. Little, Redmond, WA (US); Tristan A. Davis, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 797 days.

(21) Appl. No.: 11/066,058

(22) Filed: Feb. 25, 2005

(65) Prior Publication Data

US 2006/0080590 A1 Apr. 13, 2006

Related U.S. Application Data

(63) Continuation-in-part of application No. 10/955,612, filed on Sep. 30, 2004.

(51) Int. Cl.
*G06F 17/00* (2006.01)
*G06F 17/24* (2006.01)
*G06F 17/22* (2006.01)

(52) U.S. Cl.
CPC ............ *G06F 17/24* (2013.01); *G06F 17/2247* (2013.01)

(58) Field of Classification Search
CPC ............................... G06F 17/2247; G06F 8/38
USPC .......................................................... 715/234
See application file for complete search history.

(56) References Cited

U.S. PATENT DOCUMENTS

| | | | |
|---|---|---|---|
| 5,287,504 A | 2/1994 | Carpenter et al. | 707/201 |
| 5,440,745 A | 8/1995 | Platte et al. | 718/101 |
| 5,630,131 A | 5/1997 | Palevich et al. | 717/108 |
| 5,715,415 A | 2/1998 | Dazey et al. | |

(Continued)

FOREIGN PATENT DOCUMENTS

| | | |
|---|---|---|
| CA | 2533568 | 7/2013 |
| JP | 08-022455 | 1/1996 |

(Continued)

OTHER PUBLICATIONS

Souchon et al., "A Review of XML-compliant User-Interface Description Languages", LNCS, copyright Springer-Verlag 2003, p. 377-391.*
Meyer, "aTool—Creating Validated XML Documents on the Fly Using MS Word", SIGDOC, copyright Oct. 2002, ACM, p. 113-121.*
"Document Object Model", Mozilla Developer Network, retrieved from https://developer.mozilla.org/en-US/docs/Mozilla/Tech/XUL/Tutorial/Document_Object_Model on Apr. 4, 2015, p. 1-8.*

(Continued)

*Primary Examiner* — Amelia Tapp
(74) *Attorney, Agent, or Firm* — Jessica Meyers; Danielle Johnston-Holmes; Micky Minhas

(57) ABSTRACT

An extensible markup language ("XML") schema is provided for defining a content region which displays specific types of content in an electronic document created in a word processing application program. The schema includes structural elements for defining the content region in the electronic document. The structural elements include a properties element for defining properties associated with the content to be displayed in the content region and a content element for receiving the content to be displayed according to the defined properties. The properties element and the content element define the content region in the electronic document.

21 Claims, 6 Drawing Sheets

(56) References Cited

U.S. PATENT DOCUMENTS

| | | | | |
|---|---|---|---|---|
| 5,717,741 | A | 2/1998 | Yue et al. | 379/88.12 |
| 5,787,449 | A | 7/1998 | Vulpe et al. | 715/203 |
| 5,845,299 | A | 12/1998 | Arora et al. | 715/209 |
| 5,898,434 | A * | 4/1999 | Small et al. | 715/810 |
| 5,903,902 | A | 5/1999 | Orr et al. | 715/202 |
| 5,910,075 | A | 6/1999 | Arnell et al. | 49/25 |
| 5,911,068 | A | 6/1999 | Zimmerman et al. | 719/328 |
| 5,974,430 | A | 10/1999 | Mutschler et al. | 715/505 |
| 5,991,878 | A | 11/1999 | McDonough et al. | |
| 6,006,239 | A | 12/1999 | Bhanssali et al. | 707/201 |
| 6,014,677 | A | 1/2000 | Hayashi et al. | 707/501 |
| 6,088,431 | A | 7/2000 | LaDue | 379/114.2 |
| 6,157,940 | A | 12/2000 | Marullo et al. | 703/27 |
| 6,247,020 | B1 | 6/2001 | Minard | 707/104.1 |
| 6,268,851 | B1 | 7/2001 | Bricklin et al. | 715/744 |
| 6,275,824 | B1 | 8/2001 | O'Flaherty et al. | |
| 6,317,777 | B1 | 11/2001 | Skarbo et al. | 709/204 |
| 6,397,351 | B1 | 5/2002 | Miller et al. | 714/13 |
| 6,457,002 | B1 | 9/2002 | Beattie et al. | 707/3 |
| 6,490,601 | B1 | 12/2002 | Markus et al. | |
| 6,507,856 | B1 | 1/2003 | Chen et al. | 715/205 |
| 6,562,076 | B2 | 5/2003 | Edwards et al. | 715/229 |
| 6,571,253 | B1 | 5/2003 | Thompson et al. | 707/103 R |
| 6,629,843 | B1 | 10/2003 | Bunting et al. | |
| 6,731,314 | B1 | 5/2004 | Cheng et al. | 715/848 |
| 6,772,395 | B1 * | 8/2004 | Hyman et al. | 715/234 |
| 6,859,821 | B1 | 2/2005 | Ozzie et al. | 709/205 |
| 6,865,599 | B2 | 3/2005 | Zhang | 709/218 |
| 6,915,482 | B2 | 7/2005 | Jellum et al. | 715/234 |
| 6,920,455 | B1 | 7/2005 | Weschler | 707/100 |
| 6,944,622 | B1 | 9/2005 | Mitchell et al. | 707/102 |
| 6,944,662 | B2 | 9/2005 | Devine et al. | 709/225 |
| 6,950,990 | B2 | 9/2005 | Rajarajan et al. | 715/736 |
| 6,996,769 | B1 | 2/2006 | Peikes et al. | 715/205 |
| 7,017,112 | B2 | 3/2006 | Collie et al. | 715/513 |
| 7,035,839 | B1 | 4/2006 | Gillespie et al. | 707/2 |
| 7,039,708 | B1 | 5/2006 | Knobl et al. | 709/227 |
| 7,039,863 | B1 | 5/2006 | Caro et al. | 715/530 |
| 7,085,773 | B2 | 8/2006 | Dorsett, Jr. | 707/104.1 |
| 7,111,284 | B2 | 9/2006 | Takagi et al. | 717/136 |
| 7,117,504 | B2 | 10/2006 | Smith et al. | 719/328 |
| 7,200,816 | B2 | 4/2007 | Falk et al. | 715/762 |
| 7,237,002 | B1 | 6/2007 | Estrada et al. | 709/203 |
| 7,257,772 | B1 * | 8/2007 | Jones et al. | 715/234 |
| 7,340,481 | B1 | 3/2008 | Baer et al. | 707/104.1 |
| 7,386,563 | B1 | 6/2008 | Pal | 707/102 |
| 7,444,598 | B2 * | 10/2008 | Horvitz et al. | 715/808 |
| 7,509,305 | B2 | 3/2009 | Tozawa et al. | 707/3 |
| 7,562,342 | B2 | 7/2009 | Berg et al. | 717/108 |
| 7,617,234 | B2 | 11/2009 | Davis et al. | |
| 7,657,832 | B1 | 2/2010 | Lin | |
| 7,668,873 | B2 | 2/2010 | Davis et al. | |
| 7,707,498 | B2 | 4/2010 | Jones et al. | |
| 7,712,016 | B2 | 5/2010 | Jones et al. | |
| 7,730,394 | B2 | 6/2010 | Davis et al. | |
| 7,752,224 | B2 | 7/2010 | Davis et al. | |
| 2001/0056463 | A1 | 12/2001 | Grady et al. | |
| 2002/0010716 | A1 | 1/2002 | McCartney et al. | 707/517 |
| 2002/0013792 | A1 * | 1/2002 | Imielinski et al. | 707/523 |
| 2002/0065110 | A1 | 5/2002 | Enns et al. | 455/566 |
| 2002/0085020 | A1 * | 7/2002 | Carroll, Jr. | 345/700 |
| 2002/0107867 | A1 | 8/2002 | Takagi et al. | 707/102 |
| 2002/0133516 | A1 * | 9/2002 | Davis et al. | 707/513 |
| 2002/0161801 | A1 | 10/2002 | Hind et al. | 707/513 |
| 2002/0198962 | A1 | 12/2002 | Horn et al. | 709/218 |
| 2003/0007009 | A1 | 1/2003 | Haley | 345/805 |
| 2003/0018666 | A1 | 1/2003 | Chen et al. | 707/513 |
| 2003/0018714 | A1 * | 1/2003 | Mikhailov et al. | 709/203 |
| 2003/0023632 | A1 | 1/2003 | Ries et al. | 707/513 |
| 2003/0023953 | A1 * | 1/2003 | Lucassen et al. | 717/106 |
| 2003/0051054 | A1 | 3/2003 | Redlich et al. | 709/246 |
| 2003/0097457 | A1 | 5/2003 | Saran et al. | 709/230 |
| 2003/0159111 | A1 | 8/2003 | Fry | 715/513 |
| 2003/0163603 | A1 | 8/2003 | Fry et al. | 709/328 |
| 2003/0164859 | A1 | 9/2003 | Evans | 345/792 |
| 2003/0174162 | A1 | 9/2003 | Wu | 345/736 |
| 2004/0021679 | A1 | 2/2004 | Chapman et al. | 345/700 |
| 2004/0073565 | A1 | 4/2004 | Kaufman et al. | 707/101 |
| 2004/0088332 | A1 | 5/2004 | Lee et al. | 707/200 |
| 2004/0088647 | A1 | 5/2004 | Miller et al. | 715/234 |
| 2004/0098667 | A1 | 5/2004 | Atkinson | 715/513 |
| 2004/0103147 | A1 | 5/2004 | Flesher et al. | 709/204 |
| 2004/0111672 | A1 | 6/2004 | Bowman et al. | 715/513 |
| 2004/0153467 | A1 | 8/2004 | Conover et al. | 707/100 |
| 2004/0183830 | A1 | 9/2004 | Cody et al. | 345/752 |
| 2004/0199876 | A1 | 10/2004 | Ethier et al. | 715/249 |
| 2004/0205565 | A1 | 10/2004 | Gupta | 715/513 |
| 2004/0205653 | A1 | 10/2004 | Hadfield et al. | 715/255 |
| 2004/0217985 | A9 | 11/2004 | Ries et al. | 345/740 |
| 2004/0220926 | A1 | 11/2004 | Lamkin et al. | 770/3 |
| 2004/0221233 | A1 | 11/2004 | Thielen | |
| 2004/0225958 | A1 | 11/2004 | Halpert et al. | 715/513 |
| 2004/0237036 | A1 | 11/2004 | Qulst et al. | 715/236 |
| 2004/0243938 | A1 | 12/2004 | Weise et al. | 715/526 |
| 2004/0268240 | A1 | 12/2004 | Vincent | 715/234 |
| 2005/0014494 | A1 | 1/2005 | Owen et al. | 455/419 |
| 2005/0027618 | A1 | 2/2005 | Zucker et al. | 705/26 |
| 2005/0033667 | A1 | 2/2005 | Sugimoto et al. | 705/28 |
| 2005/0033766 | A1 | 2/2005 | Pang et al. | 707/104.1 |
| 2005/0034079 | A1 | 2/2005 | Gunasekar et al. | 715/753 |
| 2005/0044145 | A1 | 2/2005 | Quinn et al. | 709/205 |
| 2005/0050066 | A1 | 3/2005 | Hughes | 707/100 |
| 2005/0068913 | A1 | 3/2005 | Tan et al. | 370/310 |
| 2005/0071477 | A1 | 3/2005 | Evans et al. | 709/228 |
| 2005/0076295 | A1 | 4/2005 | Simske et al. | 715/517 |
| 2005/0086384 | A1 | 4/2005 | Ernst | 709/248 |
| 2005/0091346 | A1 | 4/2005 | Krishnaswami et al. | 709/220 |
| 2005/0091576 | A1 | 4/2005 | Relyea et al. | 715/502 |
| 2005/0114771 | A1 | 5/2005 | Piehler et al. | 715/264 |
| 2005/0154978 | A1 | 7/2005 | Albornoz et al. | 715/513 |
| 2005/0183001 | A1 | 8/2005 | Carter et al. | 715/501.1 |
| 2005/0187973 | A1 | 8/2005 | Brychell et al. | 707/104.1 |
| 2005/0188349 | A1 | 8/2005 | Bent et al. | 717/106 |
| 2005/0188350 | A1 | 8/2005 | Bent et al. | 717/106 |
| 2005/0289457 | A1 | 12/2005 | Obasanjo et al. | 715/513 |
| 2006/0031755 | A1 | 2/2006 | Kashi | 715/201 |
| 2006/0036692 | A1 | 2/2006 | Morinigo et al. | 709/206 |
| 2006/0041558 | A1 | 2/2006 | McCauley et al. | 707/10 |
| 2006/0048112 | A1 | 3/2006 | Thiagarajan et al. | 717/144 |
| 2006/0053158 | A1 | 3/2006 | Hall et al. | 707/102 |
| 2006/0053194 | A1 | 3/2006 | Schneider et al. | 709/204 |
| 2006/0136441 | A1 | 6/2006 | Fujisaki | 707/101 |
| 2006/0150085 | A1 | 7/2006 | Davis et al. | 715/513 |
| 2006/0195413 | A1 | 8/2006 | Davis et al. | 707/1 |
| 2006/0195454 | A1 | 8/2006 | Davis et al. | 707/100 |
| 2006/0282452 | A1 | 12/2006 | Takagi et al. | 707/101 |
| 2007/0061382 | A1 | 3/2007 | Davis et al. | 707/201 |
| 2007/0118554 | A1 | 5/2007 | Chang et al. | |

FOREIGN PATENT DOCUMENTS

| | | |
|---|---|---|
| JP | 11-306178 | 11/1999 |
| JP | 2000-048024 | 2/2000 |
| JP | 2000-227914 | 8/2000 |
| JP | 2001-052087 | 2/2001 |
| JP | 2001-075949 | 3/2001 |
| JP | 2001-117911 | 4/2001 |
| JP | 2001-125895 | 5/2001 |
| JP | 2002-118734 | 4/2002 |
| JP | 2002-229723 | 8/2002 |
| JP | 2002-236695 | 8/2002 |
| JP | 2004-46357 | 2/2004 |
| JP | 2004-046357 | 2/2004 |
| JP | 2004-054842 | 2/2004 |
| JP | 2004-199446 | 7/2004 |
| JP | 2004-265418 | 9/2004 |
| JP | 2005-071356 | 3/2005 |
| JP | 2005-518605 | 6/2005 |
| JP | 2005-526301 | 9/2005 |
| JP | 4936715 | 3/2012 |
| JP | 5072845 | 8/2012 |
| JP | 5122747 | 11/2012 |
| KR | 10-2004-0002657 | 1/2004 |
| KR | 10-2004-0002738 | 1/2004 |

(56) References Cited

FOREIGN PATENT DOCUMENTS

| KR | 2004-0020933 A | 3/2004 | | |
|---|---|---|---|---|
| KR | 2004-0034327 A | 4/2004 | | |
| KR | 10-2004-0077259 | 9/2004 | | |
| KR | 10-1169098 | 7/2012 | | |
| KR | 10-1310988 | 9/2013 | | |
| KR | 10-1311123 | 9/2013 | | |
| MX | 319885 | 4/2014 | | |
| MY | 149775 | 10/2013 | | |
| RU | 2004 136 278 A | 8/2005 | | |
| WO | WO 01/08033 A2 | 2/2001 | | |
| WO | WO 01/11486 A2 | 2/2001 | ............... | G06F 17/00 |
| WO | WO 01/11486 A3 | 2/2001 | ............... | G06F 17/00 |
| WO | WO 01/15004 A2 | 3/2001 | ............... | G06F 17/00 |
| WO | WO 01/95515 A2 | 12/2001 | ............... | G06F 17/30 |
| WO | WO 01/95515 A3 | 12/2001 | ............... | G06F 17/30 |
| WO | WO 03/085525 A2 | 10/2003 | | |

OTHER PUBLICATIONS

"Modifying a XUL Interface", Mozilla Developer Network, retrieved from https://developer.mozilla.org/en-US/docs/Mozilla/Tech/XUL/Tutorial/Modifying_a_XUL_Interface on Apr. 4, 2015, p. 1-6.*
Vanderdonckt, "USIXML: a User Interface Description Language for Specifying Multimodal User Interfaces" In Proceedings of W3C Workshop on Multimodal Interaction WMI'2004 (Jul. 2004), pp. 35-42.*
European Search Report dated Dec. 19, 2007 cited in European Application No. 05112126.7.
European Search Report dated Dec. 19, 2007 cited in European Application No. 05112131.7.
U.S. Final Office Action dated Feb. 15, 2008 cited in U.S. Appl. No. 11/066,117.
European Examination Report dated Mar. 3, 2008 cited in EP Application No. 05112131.7.
European Examination Report dated Mar. 3, 2008 cited in EP Application No. 05112126.7.
U.S. Official Action dated Jun. 28, 2007 cited in U.S. Appl. No. 11/067,383.
European Examination Report dated Jun. 12, 2008 cited in European Application No. EP 05105427.8.
McKenzie et al., "XFA Template Version 1.0", http://www.w3.org/1999/05/XFA/xfa-template, retrieved on May 30, 2008, 60 pgs.
Heslop et al., "Word 2003 Bible", Wiley Publishing, 2003, pp. 441-443.
U.S. Final Office Action dated Jul. 10, 2008 cited in U.S. Appl. No. 11/030,423.
U.S. Office Action dated Jun. 13, 2008 cited in U.S. Appl. No. 11/065,754.
U.S. Appl. No. 11/030,423, filed Jan. 6, 2005, entitled "Data Binding in a Word-Processing Application".
U.S. Appl. No. 11/065,754, filed Feb. 25, 2005, entitled "Method and Apparatus for Utilizing an Object Model for Managing Content Regions in an Electronic Document".
U.S. Appl. No. 11/066,083, filed Feb. 25, 2005, entitled "Programmability for Binding Data".
U.S. Appl. No. 11/067,383, filed Feb. 25, 2005, entitled "XML Schema for Binding Data".
U.S. Appl. No. 11/066,117, filed Feb. 25, 2005, entitled "Data Store for Software Application Documents".
U.S. Official Action dated Sep. 19, 2006 cited in U.S. Appl. No. 10/955,612.
U.S. Official Action dated Oct. 4, 2007 cited in U.S. Appl. No. 11/030,423.
U.S. Official Action dated Nov. 22, 2006 cited in U.S. Appl. No. 11/030,423.
Sara Comai et al., "Computing Graphical Queries Over XML Data," ACM Transactions on Information Systems TOIS, ACM Press, vol. 19, No. 4, Oct. 2001, pp. 371-430.
Leslie, "Using Javadoc and XML to Produce API Reference Documentation," SIGDOC 02, Oct. 23, 2002, ACM Press, pp. 104-109.
Sun et al., "Operational Transformation for Collaborative Word Processing," Proceedings of the Conference of CSCW'04, Nov. 10, 2004, ACM Press, pp. 437-446.
Ladd et al., "Using HTML, 4, XML and Java 1.2", Que, Platinum Edition, Dec. 1998, pp. 693-701.
U.S. Office Action dated Jul. 18, 2008 cited in U.S. Appl. No. 11/332,468.
U.S. Office Action dated Sep. 29, 2008 cited in U.S. Appl. No. 11/331,586.
U.S. Office Action dated Feb. 18, 2009 cited in U.S. Appl. No. 11/030,423.
U.S. Office Action dated Mar. 11, 2009 cited in U.S. Appl. No. 11/332,468.
PCT Search Report dated Jan. 16, 2007 in PCT/US2006/034802.
PCT Search Report dated Mar. 12, 2007 in PCT/US2006/034974.
Sun_Micro, "How to Write Doc Comments for the Javadoc Tool," Sep. 2004, pp. 1-16, <Retrieved from web.archive.org Oct. 4, 2008>.
C. Mascolo et al., "XMiddle: A Data-Sharing Middleware for Mobile Computing," Wireless Personal Communications, Springer, Dordrecht, NL, vol. 21, No. 1, Apr. 1, 2002, pp. 77-103.
Bodart et al., "Architecture elements for highly-interactive business-oriented applications," Lecture Notes in Computer Science, Springer Berlin/Heidelberg, vol. 753/1993, Copyright 1993, pp. 83-104.
Narravula et al., "Supporting Strong Coherency for Active Caches in Multi-Tier Data-Centers over InfiniBand," 2004, ANL.gov, pp. 1-10, <Retrieved from CiteseerX May 5, 2009>.
Narravula et al., "Designing Efficient Cooperative Caching Schemes for Multi-Tier Data Centers over RDMA-enabled Networks," Jun. 2005, OCU-CISRC-6/05-TR39, Cover Page, pp. 1-10, <Retrieved from internet May 5, 2009>.
U.S. Office Action dated Mar. 10, 2008 cited in U.S. Appl. No. 10/955,612.
U.S. Office Action dated Mar. 11, 2008 cited in U.S. Appl. No. 11/066,083.
ALTOVA, "xmlspy5: User & Reference Manual," Jan. 3, 2003, www.altova.com, pp. 13-30, 698-701, 890.
European Search Report dated Dec. 7, 2011 cited in Application No. 06803078.2-1225, 6 pgs.
"XML Tips and Techniques in Adobe Framemaker 7.2", http://help.adobe.com/en_us/Framemaker/8.0/xml_tips.pdf, 2005, 26 pp.
"Using XML Schema Definitions with Adobe LiveCycle Designer 7.0", http://partners.adobe.com/public/developer/en/livecycle/lc_designer_XML_schemas.pdf, 2005, 12 pp.
Ogbuji, U., "Thinking XML: The Open Office File Format", www.ibm.com/developerworks/xml/library/x-think15/, 2003, 6 pp.
Japanese Notice of Rejection dated Dec. 27, 2011 cited in Application No. 2008-530215, 6 pgs.
Mexican Office Action dated Sep. 29, 2011 cited in Application No. MX/a/2008/003312, 7 pgs.
"Adobe Framemaker 7.0 Solutions Guide"; 2002, XP55039674, Retrieved from the Internet: http://partners.adobe.com/public/developer/en/framemaker/FM7_Solutions_Guide.pdf [retrieved on Oct. 1, 2012]; 124 pgs.
Houser; "Creating XML Content"; 2002, XP55039853; Retrieved from the internet: http://www.groupwellesley.com/wordpress/wp-content/uploads/2011/01/xml_content.pdf [retrieved on Oct. 2, 2012]; 6 pgs.
Malaysian Substantive Examination Report in Appln No. PI 20080507 dated Jan. 15, 2013.
Korean Notice of Preliminary Rejection in Appln No. 10-2008-7005522 dated Feb. 4, 2013.
Korean Notice of Preliminary Rejection in Appln No. 10-2008-7005679 dated Feb. 4, 2013.
Japanese Notice of Rejection dated Feb. 3, 2012 cited in Application No. 2008-530185, 6 pgs.
Monma, Nobuyuji et al., "Method of the Information Gathering on the Internet by Collaborative Writing", IPSJ SIG Technical Reports, InformatioN Processing Society of Japan, Japan, Sep. 18, 2997, vol. 97, No. 91, pp. 7-12—English Abstract.
Japanese Notice of Final Rejection dated Feb. 14, 2012 cited in Application No. 2005-367248, 4 pgs.
Canadian Office Action in Appln No. 2,533,568 dated Jan. 25, 2013.

(56) References Cited

OTHER PUBLICATIONS

Russian Official Action dated Apr. 1, 2011 cited in Application No. 2412-149670RU/3023.
Korean Notice of Preliminary Rejection dated Jun. 1, 2012 cited in Application No. 10-2005-0130324.
Japanese Notice of Final Rejection and Decision to Decline Amendment dated Jun. 8, 2012 in 2005-367248.
Japanese Notice of Rejection dated Jun. 15, 2012 in 2006-009050.
Mexican Office Action dated Jun. 13, 2013 cited in Appln No. MX/a/2008/003312.
Mexican Office Action dated Aug. 3, 2013 cited in Appln No. MX/a/2008/003323.
Korean Notice of Preliminary Rejection dated Jul. 31, 2012.
Mexican Office Action in MX/a/2008/003312 mailed Sep. 10, 2012.
Japanese Notice of Rejection dated Sep. 6, 2011 cited in Application No. 2006-009050, 8 pgs.
Nakamura, Akihito et al., "A Distributed Editor and Shared Document Management in Distributed Cooperation Support System Melon," Proceedings of Multimedia, Distributed, Cooperative and Mobile Symposium (DICOMO), Information Processing Society of Japan, Japan, Jun. 30, 1999, vol. 99, No. 7, pp. 285-290 (w/English language translation), 20 pgs.
Japanese Notice of Rejection dated Sep. 24, 2013 cited in Appln No. 2012-110939.
European Office Action in EP56716TE000 mailed Oct. 10, 2012.
Mexican Office Action in MX/a/2008/003323 mailed Dec. 7, 2012.
Canadian Office Action in Appln No. 2,618,109 dated Sep. 11, 2013.
India First Examination Report dated Dec. 22, 2014 in Appln No. 133/DEL/2006, 2 pgs.
Japanese Notice of Final Rejection dated Jul. 5, 2011 cited in Application No. 2005-183577.
W. Shima, "Basic Lesson, Integrated Software for Home Use, Justhomei, Practical Seminar," ZeroPaso, The Yomiuri Shimbun, Japan, vol. 6, p. 92, Jul. 5, 2001, 13 pgs. with English language translation.
India First Examination Report dated Jan. 17, 2015 in Appln No. 3220/DEL/2005, 3 pgs.
India First Examination Report dated Feb. 2, 2015 in Appln No. 1570/DEL/2005, 2 pgs.
Korean Office Action dated Jul. 28, 2011 cited in Application No. 10-2005-0057560.
Chinese First Office Action dated May 9, 2008 cited in Chinese Application No. 200510088514.8.
U.S. Final Office Action dated May 18, 2007 cited in U.S. Appl. No. 10/955,612, 16 pgs.
Chinese Second Office Action dated Nov. 21, 2008 cited in Application No. 200510088514.8, 18pgs.
U.S. Final Office Action dated Apr. 8, 2009 cited in U.S. Appl. No. 11/066,117, 21 pgs.
Memorandum and four figures regarding StarOffice 5.1; date is unknown, but believed to be earlier than Jan. 5, 2001; 5 pgs.
Habraken, J., StarOffice 5.2 Calc Handbook, Prentice Hall, Dec. 2000, Chapter 2; 5 pgs.
Sala et al., "ML 3.0 Smoothed Aggregation User's Guide," May 2004, Computational Math & Algorithms, Sandia National Laboratories, <Retrieved from http://trilinos.sandia.gov/packages/ml/publications.hitml on Oct. 3, 2008>; 64 pgs.
European Search Report dated Mar. 31, 2006 cited in European Application No. 06100594.8-2201; 10 pgs.
Chinese First Office Action dated Jul. 4, 2008 cited in Application No. 200510128896.2; 11 pgs.
Chinese First Office Action dated Nov. 7, 2008 cited in Application No. 200610007194.3; 12 pgs.
European Communication dated May 13, 2009 cited in Application No. 05105427.8-1527; 6 pgs.
Chinese Third Office Action dated Jun. 5, 2009 cited in Application No. 200510088514.8; 7 pgs.
Chinese First Office Action dated Jul. 24, 2009 cited in Application No. 200680033069.8; 10 pgs.
Chinese First Office Action dated Aug. 28, 2009 cited in Application No. 200680033162.9; 3 pgs.
Chinese Office Action dated Aug. 29, 2008 cited in Chinese Application No. 200510128895.8; 15 pgs.
European Search Report dated Oct. 6, 2009 cited in Application No. 06824911.9-1225; 7 pgs.
Chinese Second Office Action dated Nov. 13, 2009 cited in Application No. 200510128895/8; 13 pgs.
Russian Office Action dated Dec. 18, 2009 cited in Application No. 2006101270; 11 pgs.
Chinese Second Office Action dated Jun. 29, 2010 cited in Application No. 200680033069.8; 8 pgs.
Chinese Second Office Action dated Jul. 2, 2010 cited in Application No. 200680033162.9; 8 pgs.
Australian Examiner's First Report dated Sep. 21, 2010 cited in Application No. 2006-200047; 2 pgs.
Australian Examiner's First Report dated Dec. 1, 2010 cited in Application No. 2006-287364; 2 pgs.
Japanese Notice of Final Rejection dated Jan. 14, 2011 cited in Application No. 2005-183577; 14 pgs.
Japanese Notice of Final Rejection dated Feb. 4, 2011 cited in Application No. 2005-367248; 6 pgs.
Japanese Notice of Final Rejection dated Jul. 5, 2011 cited in Application No. 2005-183577; 4 pgs.
Korean Office Action dated Jul. 28, 2011 cited in Application No. 10-2005-0054560; 4 pgs.
U.S. Final Official Action dated May 15, 2007 cited in U.S. Appl. No. 11/030,423; 14 pgs.
U.S. Official Action dated Jun. 4, 2007 cited in U.S. Appl. No. 11/066,083; 12 pgs.
U.S. Official Action dated Jun. 21, 2007 cited in U.S. Appl. No. 11/066,117; 16 pgs.
U.S. Office Action dated Jul. 26, 2007 cited in U.S. Appl. No. 11/331,586; 25 pgs.
U.S. Office Action dated Dec. 17, 2007 cited in U.S. Appl. No. 11/332,468; 23 pgs.
U.S. Office Action dated Dec. 27, 2007 cited in U.S. Appl. No. 11/331,586; 26 pgs.
U.S. Office Action dated Oct. 14, 2008 cited in U.S. Appl. No. 11/066,117; 18 pgs.
U.S. Office Action dated Dec. 3, 2008 cited in U.S. Appl. No. 10/955,612; 28 pgs.
U.S. Office Action dated Dec. 9, 2008 cited in U.S. Appl. No. 11/066,083; 24 pgs.
U.S. Office Action dated Jan. 22, 2009 cited in U.S. Appl. No. 11/065,754; 26 pgs.
U.S. Final Office Action dated May 12, 2009 cited in U.S. Appl. No. 11/331,586; 32 pgs.
U.S. Office Action dated Jun. 25, 2009 cited in U.S. Appl. No. 10/955,612; 26 pgs.
U.S. Final Office Action dated Jul. 8, 2009 cited in U.S. Appl. No. 11/065,754; 28 pgs.
U.S. Final Office Action dated Sep. 25, 2009 cited in U.S. Appl. No. 11/030,423; 10 pgs.
U.S. Final Office Action dated Oct. 6, 2009 cited in U.S. Appl. No. 11/066,083; 20 pgs.
U.S. Final Office Action dated Oct. 20, 2009 cited in U.S. Appl. No. 11/332,468; 24 pgs.
U.S. Final Office Action dated Nov. 12, 2009 cited in U.S. Appl. No. 10/955,612; 16 pgs.
U.S. Office Action dated Jun. 1, 2010 cited in U.S. Appl. No. 11/066,083; 14 pgs.
U.S. Office Action dated Nov. 13, 2009 cited in U.S. Appl. No. 11/331,586; 6 pgs.
U.S. Office Action dated Jun. 30, 2010 cited in U.S. Appl. No. 11/332,468; 25 pgs.

* cited by examiner

```
300 ↘
302 ⌐  <xsd:complexType name="CT_SdtPr">
         <xsd:sequence>
304       <xsd:element name="alias" type="CT_String"/>
306       <xsd:element name="invalidIfBlank" type="CT_OnOff"/>
308       <xsd:element name="lock" type="CT_Lock" x:dispatch-begin="HrDispatchWSdtLock(pxin, pAttr)"/>
310       <xsd:element name="placeholder" type="CT_Placeholder"/>
312       <xsd:element name="dataBinding" type="CT_DataBinding"
          x:dispatch-begin="HrDispatchWDataBindingSource(pxin, pAttr)"/>
          <xsd:choice minOccurs="0" maxOccurs="1">
314         <xsd:element name="comboBox" type="CT_SdtComboBox"/>
316         <xsd:element name="date" type="CT_SdtDate"/>
318         <xsd:element name="docPartList" type="CT_SdtDocPartList"/>
320         <xsd:element name="dropDownList" type="CT_SdtDropDownList"/>
322         <xsd:element name="picture" type="CT_SdtPicture"
            x:dispatch-begin="HrDispatchWSdtPicture(pxin, pAttr)"/>
324         <xsd:element name="richText" type="CT_Empty"/>
326         <xsd:element name="table" type="CT_SdtTable"/>
328         <xsd:element name="text" type="CT_Empty"/>
          </xsd:choice>
         </xsd:sequence>
        </xsd:complexType>

330 ⌐  <xsd:complexType name="CT_SdtContent">
         <xsd:choice minOccurs="0" maxOccurs="unbounded">
332        <xsd:element name="r" type="CT_R"/>
         </xsd:choice>
        </xsd:complexType>
```

*Fig. 3*

```
<w:sdt>
    <w:sdtPr>
        <w:alias val="My Label"/>
        <w:text/>
    </w:sdtPr>
    <w:sdtContent>
        <w:r>
            <w:t>sample content</w:t>
        </w:r>
    </w:sdtContent>
</w:sdt>
```

502 `<w:sdt>`
504 `<w:sdtPr>`, `<w:alias val="My Label"/>`
506 `<w:text/>`, `</w:sdtPr>`
508 `<w:sdtContent>`, `<w:r>`
510 `<w:t>sample content</w:t>`, `</w:r>`, `</w:sdtContent>`, `</w:sdt>`

```
<w:sdt>
    <w:sdtPr>
        <w:invalidIfBlank val="true"/>
        <w:richText/>
    </w:sdtPr>
    <w:sdtContent>
        <w:r>
            <w:t>sample content</w:t>
        </w:r>
        <w:r>
            <w:rPr>
                <w:b/>
            </w:rPr>
            <w:t>and some with bold format</w:t>
        </w:r>
    </w:sdtContent>
</w:sdt>
```

602 `<w:sdt>`, `<w:sdtPr>`
604 `<w:invalidIfBlank val="true"/>`
606 `<w:richText/>`, `</w:sdtPr>`
608 `<w:sdtContent>`, `<w:r>`
610 `<w:t>sample content</w:t>`, `</w:r>`, `<w:r>`
612 `<w:rPr>`, `<w:b/>`, `</w:rPr>`
614 `<w:t>and some with bold format</w:t>`, `</w:r>`, `</w:sdtContent>`, `</w:sdt>`

METHOD AND APPARATUS FOR UTILIZING AN EXTENSIBLE MARKUP LANGUAGE SCHEMA FOR MANAGING SPECIFIC TYPES OF CONTENT IN AN ELECTRONIC DOCUMENT

CROSS-REFERENCE TO RELATED APPLICATIONS

This patent application is a continuation-in-part application of U.S. patent application Ser. No. 10/955,612 entitled "Method, System, And Computer-Readable Medium For Managing Specific Types of Content In An Electronic Document," the disclosure of which is expressly incorporated herein, in its entirety, by reference. This patent application is also related to and filed concurrently with U.S. patent application Ser. No. 11/067,383 entitled "XML Schema For Binding Data," which is assigned to the same assignee as the present application and expressly incorporated herein, in its entirety, by reference.

BACKGROUND OF THE INVENTION

Modem word processors enable a user to readily create and insert various types of content (e.g., text, pictures, etc.) in an electronic document. In addition, modem word processors enable a user to conform individual types of content to a variety of formats. For example, text may be inserted in a document in paragraph form or as word fragments with different individual formatting properties (e.g., bold, italic, underline, font color, font size) or with no formatting at all. The freeform entry of content allowed by modern word processors, however, suffers from several drawbacks.

One drawback associated with content entry with many modern word processors is that it is often difficult for a user to readily insert, identify, and manipulate regions of the document or template which require different types of content (e.g., a specific fragment of text or a picture) in a document without either manually typing the content in or scanning another document, finding and manually selecting the location for the desired content, and then creating or moving the desired content from another location in the document to the desired location. Even if a predefined set of document fragments (i.e., content blobs) are available for insertion into the document, the document cannot express which pieces of content are valid in any specific location, other than by including static informational text which the user must read, understand, and voluntarily adhere to. Since conventional word processors do not label the locations where the different types of content (predefined or not) may be inserted in an electronic document, they do not permit a user to quickly identify the locations of interest for the insertion of specific content.

It is with respect to these considerations and others that the various embodiments of the present invention have been made.

BRIEF SUMMARY OF THE INVENTION

In accordance with the present invention, the above and other problems are solved by a providing an extensible markup language ("XML") schema and a method for utilizing the schema, for defining a content region which displays specific types of content in an electronic document created in a word processing application program. According to one aspect of the invention, the schema comprises structural elements for defining the content region in the electronic document. The structural elements include a properties element for defining properties associated with the content to be displayed in the content region and a content element for receiving the content to be displayed according to the defined properties. The properties element and the content element define the content region in the electronic document.

In the schema, the properties element can include: a first property for defining a title associated with the content region, a second property for restricting or locking the content inserted in the content region, a third property for defining placeholder or insertion text to be associated with the content region, and a fourth property for defining the validity of a blank content region. The properties element also includes a set of mutually exclusive properties defining the allowable contents within the content region consisting of: a first property for defining the content region to display and receive content associated with a date, a second property for defining the content region to display and receive content associated with a picture, a third property for defining the content region to display and receive content associated with a dropdown list, a fourth property for defining the content region to display and receive content associated with a table, a fifth property for defining the content region to display and receive content associated with a document part, a sixth property for defining the content region to display and receive content associated with rich text, a seventh property for defining the content region to display and receive content associated with text comprising a single paragraph, and an eighth property for defining the content region to display and receive a plurality of content types. The properties element also includes a formatting attribute for defining a format of the above-described properties in the electronic document.

In the schema, the content element includes elements for receiving content in the content region in the electronic document. These elements can include any combination of: a paragraph element for receiving a paragraph of text in the electronic document, a run element for receiving a region of text, the region of text comprising a contiguous run of characters with identical formatting, a table element for receiving a table, a table row element for receiving a row of table cells, and a table cell element for receiving a single table cell.

According to another aspect of the invention, a method is provided for utilizing the structural elements in the schema to define a content region for displaying content in the electronic document. The method includes defining a properties element for receiving a properties associated with the content to be displayed and defining a content element for receiving the content to be displayed according to the defined properties.

In defining the properties element, the method includes assigning a name value for a label to be associated with the content region in a first property in the properties element, assigning a locking or restriction value for setting restrictions for content inserted in the content region in a second property in the properties element, inserting text for a placeholder to be associated with the content region in a third property in the properties element, and assigning a validity value for setting the validity of a blank content region in a fourth property in the properties element. The method further includes selecting a mutually exclusive property defining the type of content to be displayed in the content region.

The mutually exclusive properties include a first property for defining the content region to display and receive content associated with a date, a second property for defining the content region to display and receive content associated with a picture, a third property for defining the content region to display and receive content associated with a dropdown list, a fourth property for defining the content region to display and receive content associated with a table, a fifth property for defining the content region to display and receive content associated with a document part, a sixth property for defining the content region to display and receive content associated with rich text, a seventh property for defining the content region to display and receive content associated with text comprising a single paragraph, and an eighth property for defining the content region to display and receive a plurality of content types. In defining a content element for receiving the content to be displayed according to the defined properties, the method includes inserting a paragraph element for receiving a paragraph of text, inserting a run element for receiving a region of text, the region of text comprising a contiguous run of characters with identical formatting, inserting a table element for receiving a table, inserting a table row element for receiving a row of table cells, and inserting a table cell element for receiving a single table cell. The paragraph element, the run element, the table element, the table row element, and the table cell element may be inserted in any order.

The invention may be implemented as a computer process, a computing system, or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features, as well as advantages, which characterize the present invention, will be apparent from a reading of the following detailed description and a review of the associated drawings.

BRIEF DESCRIPTION OF THE SEVERAL VIEWS OF THE DRAWINGS

FIG. 3 is an illustrative portion of an extensible markup language schema utilized in and provided by the various embodiments of the invention;

FIGS. 5-7 show illustrative portions of an XML document conforming to the schema for defining a content region for displaying content, according to illustrative embodiments of the invention.

DETAILED DESCRIPTION OF THE INVENTION

Figure 1:
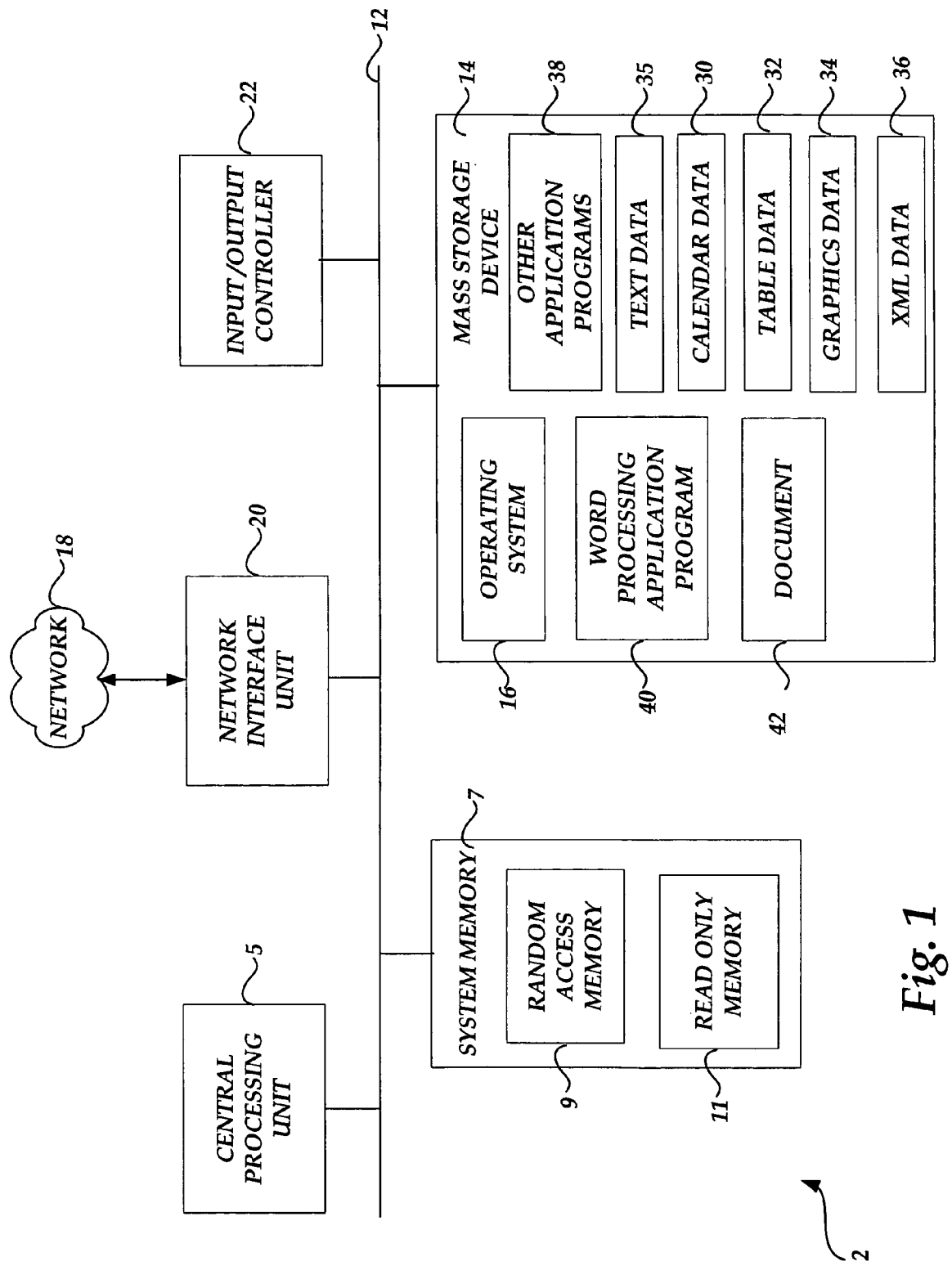
FIG. 1 is a computer system architecture diagram illustrating a computer system utilized in and provided by the various embodiments of the invention.

Referring now to the drawings, in which like numerals represent like elements, various aspects of the present invention will be described. In particular, FIG. 1 and the corresponding discussion are intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 1, an illustrative computer architecture for a computer 2 utilized in the various embodiments of the invention will be described. The computer architecture shown in FIG. 1 illustrates a conventional desktop or laptop computer, including a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The computer 2 further includes a mass storage device 14 for storing an operating system 16, application programs, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 18, such as the Internet. The computer 2 may connect to the network 18 through a network interface unit 20 connected to the bus 12. It should be appreciated that the network interface unit 20 may also be utilized to connect to other types of networks and remote computer systems. The computer 2 may also include an input/output controller 22 for receiving and processing input from a number of other devices, including a keyboard, mouse, or electronic stylus (not shown in FIG. 1). Similarly, an input/output controller 22 may provide output to a display screen, a printer, or other type of output device.

As mentioned briefly above, a number of program modules and data files may be stored in the mass storage device 14 and RAM 9 of the computer 2, including an operating system 16 suitable for controlling the operation of a networked personal computer, such as the WINDOWS XP operating system from MICROSOFT CORPORATION of Redmond, Wash. The mass storage device 14 and RAM 9 may also store one or more program modules. In particular, the mass storage device 14 and the RAM 9 may store a word processing application program 40. As known to those skilled in the art, the word processing application program 40 is operative to provide functionality for creating and editing electronic documents, such as document 48. According to one embodiment of the invention, the word processing application program 40 comprises the WORD word processing application program from MICROSOFT CORPORATION. It should be appreciated, however, that word processing application programs from other manufacturers may be utilized to embody the various aspects of the present invention. It should further be appreciated that the various aspects of the present invention are not limited to word processing application programs but may also utilize other application programs 38 which are capable of processing various forms of content (e.g. text or pictures), such as spreadsheet application programs.

In conjunction with the editing of a word processing document, the word processing application program 40 provides functionality for allowing a user to insert specific types of content into various locations in the document 42, called "content regions." For instance, according to embodiments of the invention, a user may utilize an interactive content pane generated by the word processing application program 40 which includes a content region and serves as a placeholder for inserting text such as a paragraph for the "Objective" section of a resume in the document 42. A user may utilize other interactive content panes generated by the word processing application program 40 for inserting text (which may be arbitrarily restricted by the document's author), a date 30, a table 32, or graphics data 34 (i.e., pictures) into content regions. Alternatively, a user may also define customized content as one of a set of "document parts" which may be inserted into the content region of an interactive content pane. As defined herein, document parts are preformatted structural elements or layouts which add structure to documents. Document parts may include cover pages, mathematical equations, indexes and tables (e.g., Table of Contents, Table of Figures, and Table of Authorities), page headers and footers, pages and sections (e.g., blank pages and two-column pages), personal contact information (e.g., name and address information), images, tables, and watermarks. Document parts are described in greater detail in U.S. patent application Ser. No. 10/955,622, entitled "Method, System, And Computer-Readable Medium For Creating, Inserting, And Reusing Document Parts In An Electronic Document," the disclosure of which is incorporated herein, in its entirety, by reference.

It should be appreciated that the word processing application program 40 may utilize interactive content panes to restrict the specific types of content which may be entered into the document 42. According to various embodiments of the invention, the word processing application program 40 is also operative for generating interactive content panes which serve as bindings between areas of the document 42 and an external data source, such as Extensible Markup Language ("XML") data 36. According to still other embodiments of the invention, the word processing application program 40 (or other text processing application program) may utilize an XML schema comprising structural elements for defining a content region for displaying content in the document 42.

As is understood by those skilled in the art, XML is a standard format for communicating data. In the XML data format, a schema is used to provide XML data with a set of grammatical and data type rules governing the types and structure of data that may be communicated. It will be appreciated that the schema utilized in the illustrative embodiments of the invention described herein may be correspond to a specified portion of the Wordprocessing ML ("WordML") format developed by MICROSOFT CORPORATION. WordML is an XML schema for all of the possible contents of a word processing document saved by the WORD application program. A simple WordML document consists of five elements and a single namespace. The five elements are:

wordDocument element: The root element for a WordML document;
body element: The container for the displayable text;
p element: A paragraph. There can be any number of paragraphs in the body tag;
r element: A run. A contiguous set of WordML components inside of a paragraph, with a consistent set of properties; and
t element: A piece of text within a run.

It will be appreciated that in the illustrative embodiments of the invention described herein, the WordML schema is modified by adding properties for persisting information about content regions in a document. Thus, it should be understood that the schema may be utilized to apply content regions with specific properties to regions of text within a word processing document. These content regions must be applied to either:

One or more complete paragraphs; or
A selection of text within a paragraph.

The properties of a content region may be set so that the user's actions when editing the word processing document are restricted as desired by the document's original author (who created the content regions). Each of the properties may correspond to individual child elements under a single (content region properties) parent element.

Figure 2:
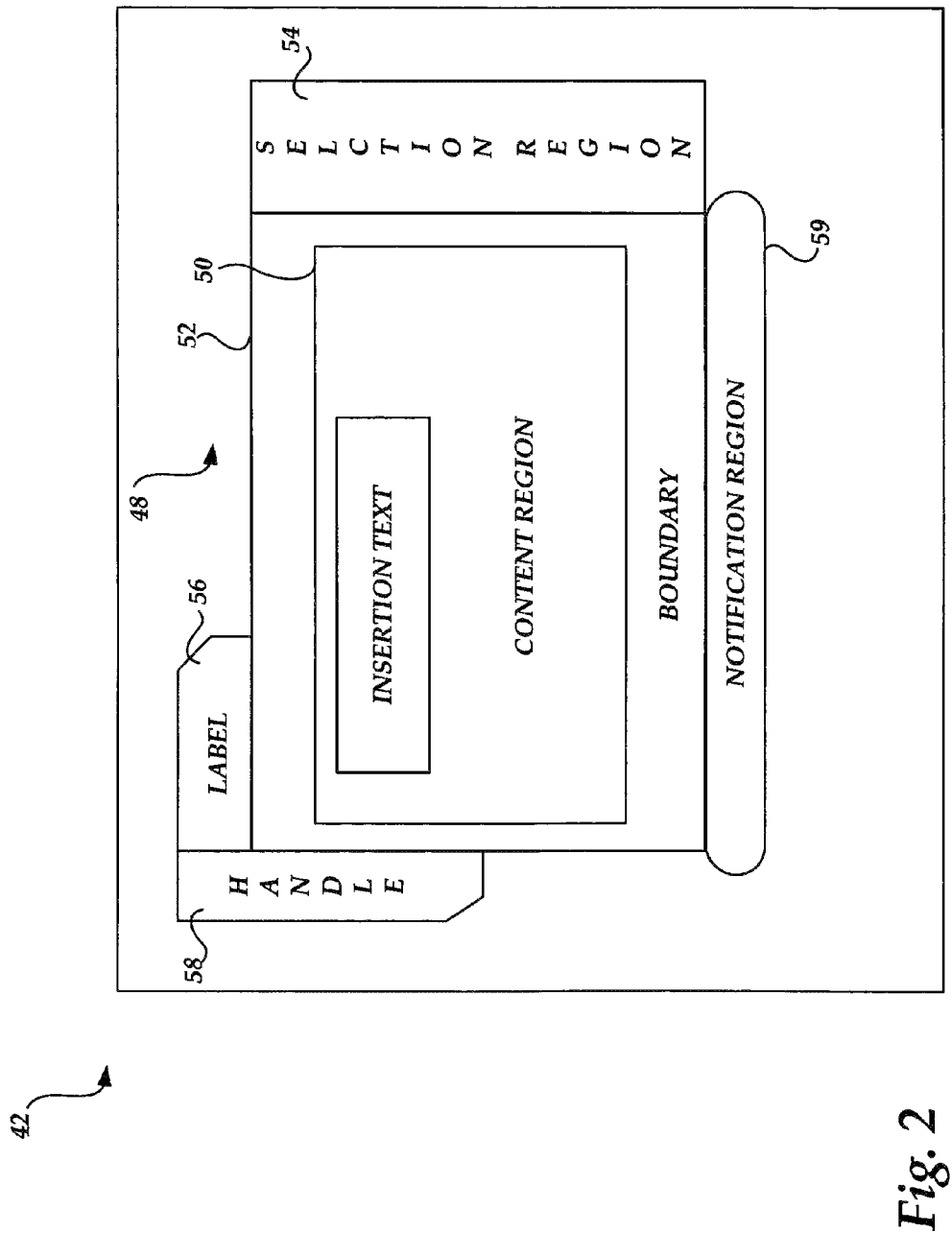
FIG. 2 is a block diagram of an interactive content pane according to an illustrative embodiment of the invention.

Referring now to FIG. 2, an interactive content pane 48 is shown according to an illustrative embodiment of the present invention. The interactive content pane 48 includes a content region 50 for receiving and displaying specific types of content (e.g., text, graphics data, calendar data, or table data) in the document 42. The content region 50 includes a place for instructional text 62 which provides instructions for inserting specific content whenever the content region is empty. For instance, a content region for inserting an "Objective" paragraph in a resume document may include instructional text such as "Please insert your objective paragraph here." It will be appreciated that the instructional text may be tailored to the specific content to be received in the content region of an interactive content pane. For instance, a graphics data or picture content region may include instructional text such as "Insert your photo here." It should be understood that once a user clicks in the content region 50 containing the instructional 62, the instructional text disappears to allow the user to insert the specific content.

As shown in FIG. 2, the interactive content pane 48 also includes a boundary 52, a selection region 54, a label 56, a handle 58, and a notification region 59. The boundary 52 defines limits for the content region 50 for receiving and displaying the specific type of content. In one illustrative embodiment, the boundary 52 may fix the area of the content region 50 to a specific size. For instance, the content region for a single paragraph interactive content pane may be limited to fifteen lines of text. Once this limit is reached, no further text is permitted to be entered into the content region.

The selection region 54 is a user interface for selecting specific types of content from similar content, for display in the content region 50. For instance, a selection region in an interactive content pane for inserting calendar data may include a user interface for selecting a date from a calendar for insertion in a document. The selection region 54 may also display a user with choices from a list of predefined items in a dropdown list, for example. It will be appreciated that in one illustrative embodiment, the user interface in the selection region 54 may automatically be generated when a user clicks in the content region of certain types of interactive content regions. For instance, a user clicking into an interactive content region defined for inserting calendar data may automatically generate a calendar user interface for a user to select a specific date.

The label 56 identifies the specific type of content (e.g., dates) which may be entered into the content region 50. The handle 58 is utilized to "drag" the interactive content region 48 to different areas of a displayed document. The notification region 59 is utilized to communicate messages to a user. It should be understood that the word processing application program 40 includes functionality for validating specific content entered into the content region 50. Thus, the notification region 59 may communicate error messages when content received in the content region does not correspond to the specific type of content for an interactive content pane or when the specific type of content received in the content region exceeds a predefined content restriction (e.g., the number of lines or characters in a paragraph).

Referring now to FIG. 3, an illustrative XML schema 300 for defining properties and content in a content region will be described. The schema 300 includes a properties element 302 for defining properties associated with a content region. The properties are defined in a number of child elements. The child elements include alias element 304, invalidIfBlank element 306, lock element 308, placeholder element 310, and dataBinding element 312.

The alias element 304 is utilized to provide a name to be displayed in the label 56 associated with a content region in an interactive content pane. The invalidIfBlank element 306 is utilized to specify whether an empty content region should be considered invalid for a content region. The invalidIfBlank element 306 may include the attribute values "On" or "Off" with the On value corresponding to an empty content region being specified as invalid. The lock element 308 is utilized to specify a locking state of a content region. In particular, the lock element 308 may set content in a content region to be undeletable and/or uneditable. The lock element 308 may include the attribute values "locked-content-block" (i.e., the content region is undeletable), "locked-text" (i.e., the content block is uneditable), "locked-content-block-and-text" (i.e., the content block is undeletable and uneditable), and "no-locking." The placeholder element 310 is utilized to specify instructional text for a content region such as "Insert your photo here." The dataBinding element 312 contains properties for binding data to a content region. This element is described in greater detail in co-pending U.S. patent application Ser. No. 11/067,383 entitled "XML Schema For Binding Data," which is expressly incorporated herein, in its entirety, by reference.

The properties element 302 also includes a number of mutually exclusive child elements for defining properties associated with a content region. The properties are mutually exclusive in that only one of them may be defined for a particular content region. The mutually exclusive child elements include a comboBox element 314, a date element 316, a docPartList (i.e., "document part list") element 318, a dropDownList element 320, a picture element 322, a richText element 324, a table element 326, and a text element 328.

The comboBox element 329 is utilized to specify that a content region may contain multiple content types (e.g., a picture and rich text). The date element 316 is utilized to specify that a content region must contain a date. The date element 316 includes a formatting attribute which allows the user to select a format in which the date is displayed in a content region (e.g., Year/Month/Day or Month/Day/Year). The docPartList element 318 is utilized to specify that a content region must contain a document part list (e.g., categories of document parts such as cover pages, header, footers, etc.). The dropDownList element 320 is utilized to specify that a content region must contain a "dropdown list." The dropDownList element 320 may include the child element ListItem which contains the definition for a single entry in the dropdown list. The ListItem element may contain the following attributes:

displayText—specifies that the contents of the dropdown entry are displayed to a user;

value—specifies the actual value of the dropdown entry; and order—specifies the order in which the entry appears in the dropdown list.

The picture element 322 is utilized to specify that a content region must contain a picture or graphic. The picture element 322 may include the child element PictureStorage for specifying the storage location of the picture to be displayed in the content region. The PictureStorage element includes the attributes linked-to-file and embedded-in-file which specify the storage format for the picture. It should be understood that the linked-to-file attribute specifies that the content region may contain an internal link referencing a picture file within the document itself or on a computer system while the embedded-in-file attribute specifies an object representing the picture which is embedded directly within the content region in an encoded format. The richText element 324 is utilized to specify that a content region must contain multiple paragraphs or "rich text" (i.e., text formatted to include features such as fonts and margins. The table element 326 is utilized to specify that a content region must contain a table (i.e., at least one row or column of cells). The text element 328 is utilized to specify that a content region must contain a single paragraph of text.

The schema 300 also includes a Content element 330 for defining properties of content which may be received in a content region. The Content element 330 may include a number of child elements. For instance, the Content element 330 may include a Run element 332 which specifies content comprising a contiguous run of characters with identical formatting. Other child elements within the Content element 330 may include a paragraph element which specifies a paragraph, a table element which specifies a table, a table row element which specifies a table row, and a table cell element which specifies single table cell. It will be appreciated that the paragraph element, the run element, the table element, the table row element, and the table cell element may be inserted in any order.

Figure 4:
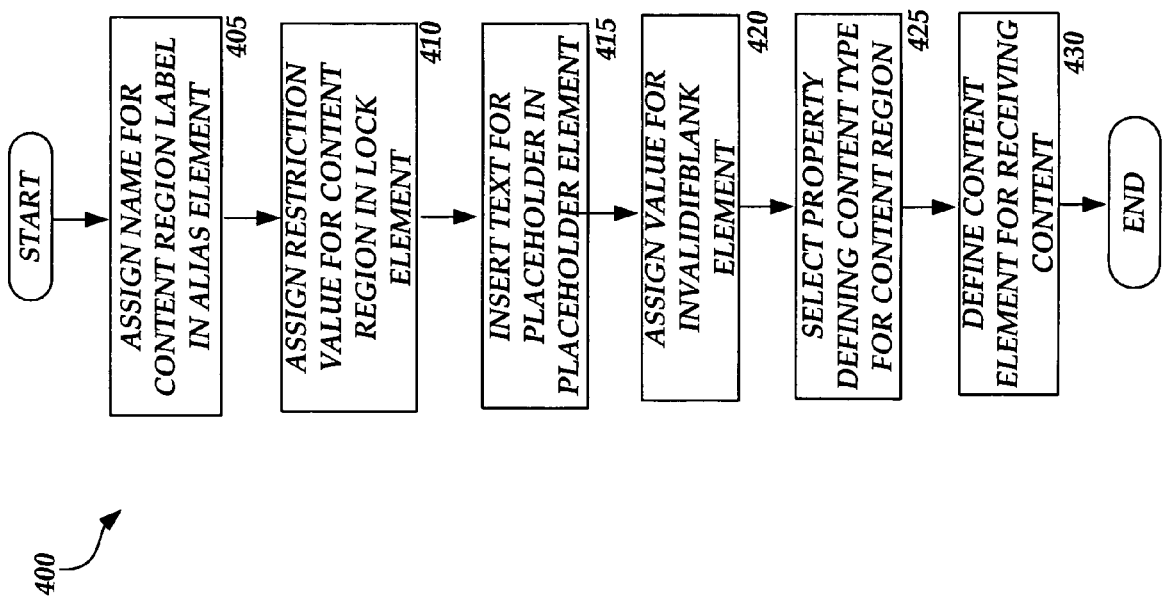
FIG. 4 is an illustrative routine for utilizing the schema of FIG. 3 for defining a content region for displaying content, according to an illustrative embodiment of the invention.

Referring now to FIG. 4 an illustrative routine 400 will be described illustrating a process for utilizing a schema (such as the schema 300) to define a content region for displaying content in an electronic document created in the word processing application program 40. It should be appreciated that although the embodiments of the invention described herein are presented in the context of the word processing application program 40, the invention may be utilized in other types of application programs that support text and data processing. For instance, the embodiments of the invention described herein may be utilized within a spreadsheet application program, a presentation application program, a drawing or computer-aided design application program, or a database application program.

When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIG. 4, and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims set forth herein.

Referring now to FIG. 4, the routine 400 begins at operation 405, wherein the alias element 304 receives a name for a label which is displayed with a content region in the electronic document. In particular, a user may insert a text string within the alias element 304. The routine 400 continues from operation 400 at operation 410, wherein the lock element 308 receives a restriction value for a content region. As discussed above with respect to FIG. 3, the lock element 308 includes a lockingType attribute in which a user may specify values for restricting a content region (i.e., preventing the editing of content in the content region and/or preventing the deletion of content in the content region). An example of the utilization of the lock element 308 and the lockingType attribute in a schema will be described below with respect to FIG. 7.

The routine 400 continues from operation 410 at operation 415, wherein the placeholder element 310 receives insertion text for a content region. In particular, a user may insert a text string within the placeholder element 310 to provide information on a document part which contains the placeholder text. For instance, in a resume the insertion text may read "Insert Objective here." The routine 400 continues from operation 415 at operation 420 wherein the InvalidifBlank element 306 receives a value indicating whether an empty content region should be considered invalid. In particular, a user may set the InvalidifBlank element to "On" to prevent empty content regions in an electronic document. For instance, for a content region set to invalid if blank, a user navigating outside of a blank content region in an electronic document may cause the generation of an error message in a notification region (such the notification region 59 of FIG. 2) associated with the content region.

The routine 400 continues from operation 420 at operation 425 wherein a content type is selected in the schema for the content region. In particular, a user may select one of the mutually exclusive property elements 314 through 328 to define a content region to receive a specific type of content (e.g., a date or a picture). The routine 400 continues from operation 425 at operation 430 wherein the Content element 330 is defined for receiving content for display in a content region. In particular, a user may insert in the Content element 430 a paragraph element for receiving a paragraph of text, a run element for receiving a run of characters, or one or more table elements for receiving table data. The routine 400 then ends.

Figure 7:
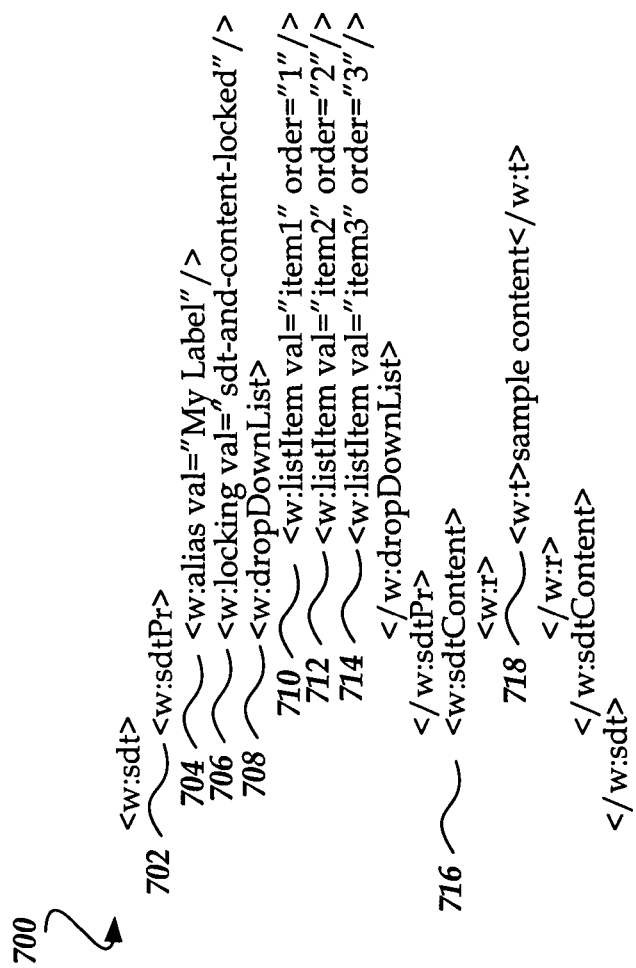

FIGS. 5-7 show illustrative portions of a document conforming to the schema for defining a content region for displaying content, according to illustrative embodiments of the invention. Turning now to FIG. 5, a schema portion 500 is shown for defining a plain text only content region, with a label reading "My Label." The schema portion 500 includes a properties element 502 for defining the properties of the content region, alias element 504 with attribute value "My Label," and text element 506 for defining the content region to receive unformatted text. The schema portion 500 also includes a Content element 508 and the text "sample content" to be displayed in the content region.

Turning now to FIG. 6, a schema portion 600 is shown for defining a rich text content region which is set to be invalid if empty. The schema portion 500 includes a properties element 602 for defining the properties of the content region, invalidIfBlank element 604 with attribute value "true," and richText element 606 for defining the content region to receive rich text. The schema portion 600 also includes a Content element 608, the text "sample content" to be displayed in the content region," and the formatting element 612 identifying the formatting to be applied to the text in element 614 (i.e., bold format).

Turning now to FIG. 7, a portion of an XML document confirming to the schema 700 is shown for defining a drop-down list content region, set to be undeletable and uneditable, with a label of "My label." The schema portion 700 includes a properties element 702 for defining the properties of the content region, alias element 504 with attribute value "My Label," lock element 706 with a lockingType attribute value indicating locked content, and dropDownList element 708 with listItem attributes 710, 712, and 714 identifying the list items and their order. The schema portion 700 also includes a Content element 716 and the text "sample content" to be displayed in the content region.

Based on the foregoing, it should be appreciated that the various embodiments of the invention include an XML schema and a method for utilizing the schema, for defining a content region which displays specific types of content in an electronic document created in a word processing application program. The above specification, examples and data provide a complete description of the manufacture and use of the composition of the invention. Since many embodiments of the invention can be made without departing from the spirit and scope of the invention, the invention resides in the claims hereinafter appended.

We claim:

1. An extensible markup language schema comprising structural elements, processed by a computing device operatively associated with the extensible markup language schema, for defining a content region for displaying content in an electronic document created in a word processing application program, the computing device comprising a memory storage for storing the structural elements, the structural elements comprising:

a selection element operative to provide selections for a type of interactive content pane;

a properties element for defining properties associated with the content to be displayed within the interactive content pane, wherein the properties element comprises a plurality of mutually exclusive child elements for defining the properties associated with the content, and wherein the properties are defined through receipt of manipulations to the at least one of the plurality of child elements; and a content element for receiving the content to be displayed according to the defined properties, wherein the properties element and the content element define a content region within the interactive content pane, the content region being tailored to the type of interactive content pane, wherein the content element is configured to selectively provide a user interface in response to selection of the content element in the interactive content pane.

2. The extensible markup language schema of claim 1, wherein the plurality of child elements comprises a plurality of mutually exclusive properties, the mutually exclusive properties comprising:
 a first mutually exclusive property for defining the content region to display and receive a first portion of the content associated with a date;
 a second mutually exclusive property for defining the content region to display and receive a second portion of the content associated with a picture;
 a third mutually exclusive property for defining the content region to display and receive a third portion of the content associated with a dropdown list;
 a fourth mutually exclusive property for defining the content region to display and receive a fourth portion of the content associated with a table;
 a fifth mutually exclusive property for defining the content region to display and receive a fifth portion of the content associated with a document part;
 a sixth mutually exclusive property for defining the content region to display and receive a sixth portion of the content associated with rich text;
 a seventh mutually exclusive property for defining the content region to display and receive a seventh portion of the content associated with text comprising a single paragraph; and
 an eighth mutually exclusive property for defining the content region to display and receive an eighth portion of the plurality of content types.

3. The extensible markup language schema of claim 1, wherein the content element comprises a plurality of elements for receiving content in the content region in the electronic document, the plurality of elements comprising:
 a paragraph element for receiving a paragraph of text in the electronic document;
 a run element for receiving a region of text, the region of text comprising a contiguous run of characters with identical formatting;
 a table element for receiving a table;
 a table row element for receiving a row of table cells; and
 a table cell element for receiving a single table cell.

4. A method for utilizing an extensible markup language schema comprising structural elements for defining a content region for displaying content in an electronic document created in a word processing application program, the method comprising:
 receiving a selection of a type of interactive content pane;
 defining a plurality of properties associated with a type of content to be displayed within the interactive content pane, the type of content being based on the selected type of interactive content pane, wherein defining the plurality of properties comprises manipulating at least one of a plurality of mutually exclusive child elements associated with the interactive content pane, the manipulations modifying the underlying extensible markup language schema;
 defining a content element for receiving the content to be displayed according to the defined properties, the properties element and the content element defining a content region within the interactive content pane, the content region being tailored to the selected type of interactive content pane; and providing the interactive content pane, wherein providing the interactive content pane further comprising selectively providing a user interface in response to selection of the content element in the interactive content pane.

5. The method of claim 4, wherein defining the plurality of properties associated with the content to be displayed further comprises:
 assigning a name value for a label to be associated with the content region in a first property in the properties element;
 inserting text for a placeholder to be associated with the content region in a second property in the properties element; and
 assigning a validity value for setting a validity of a blank content region in a third property in the properties element.

6. The method of claim 4, wherein manipulating at least one of the plurality of child elements associated with the content to be displayed comprises selecting the at least one of the mutually exclusive property defining the type of the content to be displayed in the content region.

7. The method of claim 6, wherein selecting the mutually exclusive property comprises selecting a property from the group consisting of:
 a first property for defining the content region to display and receive a first portion of the content associated with a date;
 a second property for defining the content region to display and receive a second portion of the content associated with a picture;
 a third property for defining the content region to display and receive a third portion of the content associated with a dropdown list;
 a fourth property for defining the content region to display and receive a fourth portion of the content associated with a table;
 a fifth property for defining the content region to display and receive a fifth portion of the content associated with a document part;
 a sixth property for defining the content region to display and receive a sixth portion of the content associated with rich text;
 a seventh property for defining the content region to display and receive a seventh portion of the content associated with text comprising a single paragraph; and
 an eighth property for defining the content region to display and receive an eighth portion of the plurality of content types.

8. The method of claim 4, wherein defining the content element for receiving the content to be displayed according to the defined properties comprises inserting a paragraph element for receiving a paragraph of text.

9. The method of claim 4, wherein defining the content element for receiving the content to be displayed according to the defined properties comprises inserting a run element for receiving a region of text, the region of text comprising a contiguous run of characters with identical formatting.

10. The method of claim 4, wherein defining the content element for receiving the content to be displayed according to the defined properties comprises inserting a table element for receiving a table.

11. The method of claim 4, wherein defining the content element for receiving the content to be displayed according to the defined properties comprises inserting a table row element for receiving a row of table cells.

12. The method of claim 4, wherein defining the content element for receiving the content to be displayed according to the defined properties comprises inserting a table cell element for receiving a single table cell.

13. The method of claim 4, wherein defining the content element for receiving the content to be displayed according to the defined properties comprises inserting a plurality of elements comprising a paragraph element, a run element, a table element, a table row element, and a table cell element in any order.

14. A computer-readable storage device comprising computer-executable instructions which when executed on a computer perform a method for utilizing an extensible markup language schema comprising structural elements for defining a content region for displaying content in an electronic document created in a word processing application program, the method executed by the computer-executable instructions comprising:
   receiving a selection of a type of interactive content pane;
   defining a plurality of properties associated with a type of content to be displayed within the interactive content pane, the type of content being based on the selected type of interactive content pane, the plurality of properties element being defined through manipulations to at least one of a plurality of mutually exclusive child elements associated with the interactive content pane, the manipulations modifying the underlying extensible markup language schema that define the plurality of properties;
   defining a content element for receiving the content to be displayed according to the defined properties, the properties element and the content element defining a content region within the interactive content pane, the content region being tailored to the selected type of interactive content pane; and
   providing an interactive content pane, wherein providing the interactive content pane further comprising selectively providing a user interface in response to selection of the content element in the interactive content pane.

15. The computer-readable storage device of claim 14, wherein defining the plurality of properties associated with the content to be displayed further comprises:
   assigning a name value for a label to be associated with the content region in a first property in the properties element;
   inserting text for a placeholder to be associated with the content region in a second property in the properties element; and
   assigning a validity value for setting a validity of a blank content region in a third property in the properties element.

16. The computer-readable storage device of claim 14, wherein defining the plurality of properties associated with the content to be displayed comprises selecting a mutually exclusive property defining the at least one type of the content to be displayed in the content region.

17. The computer-readable storage device of claim 16, wherein selecting the mutually exclusive property comprises selecting a property from the group consisting of:
   a first property for defining the content region to display and receive a first portion of the content associated with a date;
   a second property for defining the content region to display and receive a second portion of the content associated with a picture;
   a third property for defining the content region to display and receive a third portion of the content associated with a dropdown list;
   a fourth property for defining the content region to display and receive a fourth portion of the content associated with a table;
   a fifth property for defining the content region to display and receive a fifth portion of the content associated with a document part;
   a sixth property for defining the content region to display and receive a sixth portion of the content associated with rich text;
   a seventh property for defining the content region to display and receive a seventh portion of the content associated with text comprising a single paragraph; and
   an eighth property for defining the content region to display and receive an eighth portion of the plurality of content types.

18. The computer-readable storage device of claim 14, wherein defining the content element for receiving the content to be displayed according to the defined properties comprises inserting a paragraph element for receiving a paragraph of text.

19. The computer-readable storage device of claim 14, wherein defining the content element for receiving the content to be displayed according to the defined properties comprises inserting a run element for receiving a region of text, the region of text comprising a contiguous run of characters with identical formatting.

20. The computer-readable storage device of claim 14, wherein defining the content element for receiving the content to be displayed according to the defined properties comprises inserting a table element for receiving a table.

21. The computer-readable storage device of claim 14, wherein defining the content element for receiving the content to be displayed according to the defined properties comprises inserting a plurality of elements comprising a paragraph element, a run element, a table element, a table row element, and a table cell element in any order.

* * * * *